C. PARTELLO.
TRAP.
APPLICATION FILED APR. 3, 1917.
1,246,782.
Patented Nov. 13, 1917.
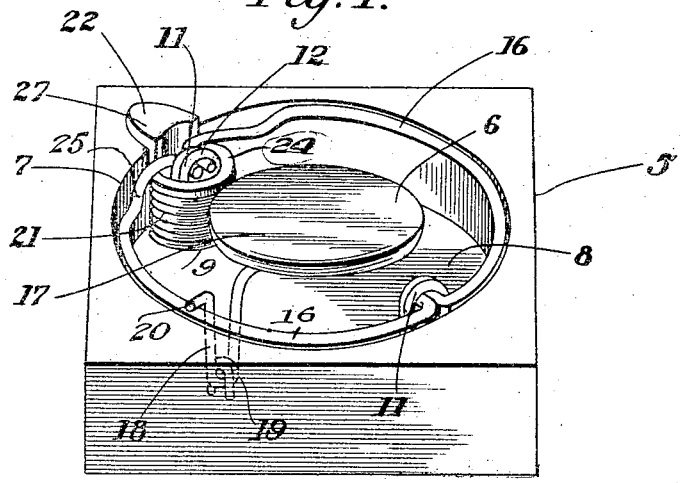
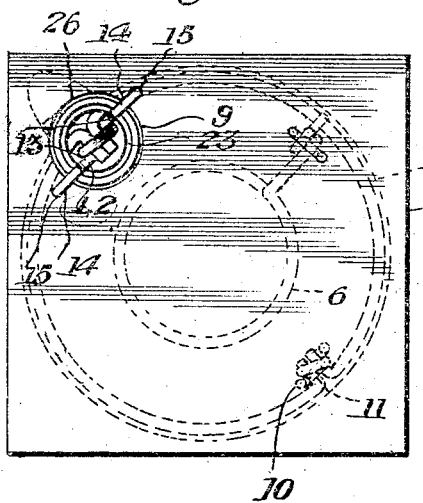
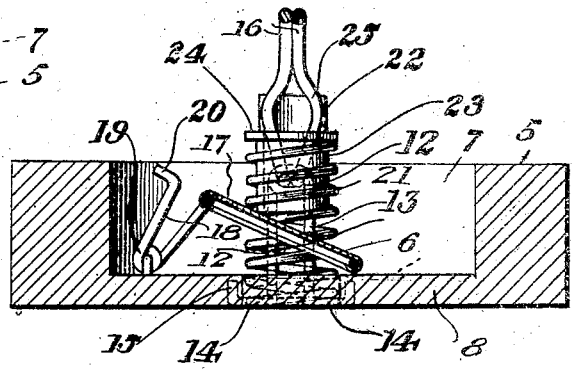
WITNESSES
INVENTOR
C. Partello
BY Victor J. Evans
ATTORNEY

UNITED STATES PATENT OFFICE.

CHARLES PARTELLO, OF LIVERPOOL, NEW YORK.

TRAP.

1,246,782.   Specification of Letters Patent.   Patented Nov. 13, 1917.

Application filed April 3, 1917. Serial No. 159,476.

*To all whom it may concern:*

Be it known that I, CHARLES PARTELLO, a citizen of the United States, residing at Liverpool, in the county of Onondaga and State of New York, have invented new and useful Improvements in Traps, of which the following is a specification.

The present invention contemplates improvements in traps and more particularly impalement traps.

The primary object of the present invention resides in the production of a trap primarily adapted for entrapping rats, and wherein novel means are provided for effecting the setting operation of the trap, and so tensioning the jaws to readily entrap the animal therebetween upon the tampering of the trap by the animal.

To this end, the invention among other features contemplates the provision of a trap which shall be simple in construction, effective and durable in use, and one wherein the bait holding plate, upon the set position of the trap, is disposed centrally of the pan or receptacle to prevent the animal from escaping from the trap after once approaching the same.

With the above and other objects in view, the invention consists in the novel features, details of construction and combination of parts which will hereinafter be more fully set forth, illustrated in the accompanying drawing and pointed out in the appended claim.

Figure 1 is a perspective view of the trap shown in set position;

Fig. 2 is a bottom plan view; and

Fig. 3 is a sectional view taken through the pan and showing the jaws of the trap in closed position.

Referring more particularly to the accompanying drawing, in which like characters of reference refer to corresponding parts in the several views, 5 denotes the trap generally which may be constructed of any suitable material, and comprising a pan 6 provided in the top thereof with an annular recess 7. The closed bottom wall 8 of the recess is formed to one side of its axis with an enlarged circular opening 9 opening out through the bottom surface of the closed bottom wall 8 of the recess for a purpose to be hereinafter more fully set forth. An upright 10 is secured to the closed bottom wall 8 of the annular recess 7 at a point diametrically opposite the opening 9 in the form of a staple or the like. The intermediate portion of the strand forming this upright is coiled as at 11 to provide a bearing.

A second upright 12 of identical construction with that described for the upright 10 is employed and the legs 13 of this upright project downwardly through the opening 9 and beyond the bottom of the pan 6 to provide the same with extensions 14, the extensions 14 of the upright 12 being bent outwardly and arranged in a pair of recesses 15 formed diametrically of the opening 9. Pivotally mounted in the coiled bearings 11 of the respective uprights 10 and 12, is a pair of jaws 16 of semi-circular form and adapted to repose within the annular recess 7 of the pan when assuming an open position. A plate 17 is provided with a U-shaped trigger 18 coiled at its intermediate portion as at 19 to provide a bearing for pivotally mounting the pan within the annular recess 7 at a point at right angles with respect to the opening 9. The free end of the trigger terminates in an angular lip 20 adapted to fit over one of the jaws 16 for holding the latter in a set position. Embracing the second upright or the upright 12 is a strong coiled spring 21 of a diameter slightly less than the diameter of the opening 9 to permit, upon the opening action of the jaws, to compress the spring within the opening and the bottom convolute of the spring in engagement with the extensions 14 of the upright.

22 designates a setting member which in this particular instance is illustrated as embodying a hollow cylindrical body portion 23 embraced by the upper portion of the coiled spring 21 and yieldably supported on the spring, due to the fact that the uppermost convolute of the spring contacts with the annular flange 24 of the body. The body 23 is of lesser diameter than the opening 9 and of a length to permit the lower portion thereof to engage in the opening upon the compression of the spring by the contact of the outwardly bulged portion 25 of the jaws against the flange 24. At a point in vertical alinement with the opening 9 the side wall forming the annular recess 7 is convexed as at 26 in which the spring 21 is seated, simplifying the setting operation of the trap upon exerting downward pressure on the thumb latch 27 formed on one side of the annular flange 24 of the setting member.

From the foregoing description, taken in connection with the accompanying drawing, the advantages of construction and the method of operation will be readily apparent to those skilled in the art to which the invention relates, and while I have described the principles of operation of the invention, together with the device which I now consider to be the best embodiment thereof, I desire to have it understood that the device shown is merely illustrative and that such changes may be made when desired as are within the scope of the appended claim.

What is claimed as new, is:—

A trap of the character set forth embodying a pan formed with an annular recess having a closed bottom wall provided with an opening, a trigger pivotally connected within the recess at a point at right angles to said opening, an upright fixedly secured to the closed bottom wall of the recess at a point diametrically opposite said opening, a second upright mounted in said opening, a pair of jaws pivotally mounted in the first and second mentioned uprights and of a contour conforming with the contour of the recess of said pan, a coiled spring embracing the second upright and reposing on the free ends thereof, a cylindrical hollow setting member with which the opposite ends of the spring engage for tensioning said setting member, and a thumb latch formed on the upper end of the setting member for compressing the latter and the spring downwardly within the opening of the closed bottom wall of said annular recess.

In testimony whereof I affix my signature.

CHARLES PARTELLO.

Copies of this patent may be obtained for five cents each, by addressing the "Commissioner of Patents, Washington, D. C."